(12) United States Patent
Chittireddy et al.

(10) Patent No.: US 10,404,684 B1
(45) Date of Patent: Sep. 3, 2019

(54) MOBILE DEVICE MANAGEMENT REGISTRATION

(71) Applicant: MOBILE IRON, INC., Mountain View, CA (US)

(72) Inventors: Sudheer Babu Chittireddy, Cupertino, CA (US); Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 86 days.

(21) Appl. No.: 14/966,511

(22) Filed: Dec. 11, 2015

Related U.S. Application Data (60) Provisional application No. 62/091,414, filed on Dec. 12, 2014.

(51) Int. Cl.
| | |
|---|---|
| *H04L 9/00* | (2006.01) |
| *H04L 29/06* | (2006.01) |
| *H04W 60/04* | (2009.01) |
| *H04W 8/20* | (2009.01) |
| *H04W 12/06* | (2009.01) |
| *H04W 12/08* | (2009.01) |

(52) U.S. Cl.
CPC ........ *H04L 63/083* (2013.01); *H04L 63/0815* (2013.01); *H04W 8/20* (2013.01); *H04W 12/06* (2013.01); *H04W 12/08* (2013.01); *H04W 60/04* (2013.01)

(58) Field of Classification Search
CPC .................................................... H04L 63/083
See application file for complete search history.

(56) References Cited

U.S. PATENT DOCUMENTS

2015/0319252 A1* 11/2015 Momchilov .......... H04L 67/141
709/223
2016/0087955 A1* 3/2016 Mohamad Abdul ...... G06F 8/60
726/7

* cited by examiner

*Primary Examiner* — Alexander Lagor
*Assistant Examiner* — Syed M Ahsan
(74) *Attorney, Agent, or Firm* — Van Pelt, Yi & James LLP (57) ABSTRACT

Techniques of the present disclosure register a device to a mobile device management (MDM) network to enable access of the MDM network. In some embodiments, a registration service receives a request to register a device as a device managed by an enterprise associated with the registration service. In response, the registration service sends a response redirecting the device to authenticate via an authentication service, where the device is configured via an authentication profile to authenticate via the authentication service. The device sends a token issued by the authentication service of the enterprise. The registration service provides access to the registration service based the received token, including by allowing the registration service to be used to register the device as a device managed at least in part by the enterprise. The present techniques improve security of communications by registering a device without requiring input of sensitive authentication information.

22 Claims, 6 Drawing Sheets

MOBILE DEVICE MANAGEMENT REGISTRATION

CROSS REFERENCE TO OTHER APPLICATIONS

This application claims priority to U.S. Provisional Patent Application No. 62/091,414 entitled MOBILE DEVICE MANAGEMENT REGISTRATION filed Dec. 12, 2014, which is incorporated herein by reference for all purposes.

BACKGROUND OF THE INVENTION

Bring-your-own-device (BYOD) plans in which individuals use personal mobile devices to access enterprise information and applications are becoming increasingly popular. The devices are typically managed by an enterprise administrator using mobile device management (MDM) solutions. Conventionally, when an enterprise deploys MDM functionality to an employee's device, an enterprise uses credentials such as a user ID, password, a one-time personal identification number (PIN) number, and/or other information to register the device. The registration process involves sending the credentials to a third party or over a communication channel. The third party or other unauthorized user who intercepts the credentials on the communication channel can use the information to access the enterprise information and applications. Thus, there exists a need in the art for a device registration scheme that decreases the risk of a security breach.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions. Unless stated otherwise, the term "network," "communication channel," and "communication link" can be implemented by any one or combination of: wired communication means, wireless communication means, packet-switched network, and circuit-switched network.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
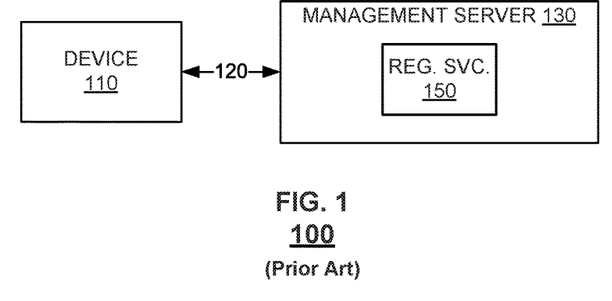
FIG. 1 is a block diagram of a conventional system for registering a device.

FIG. 1 is a block diagram of a conventional system 100 for registering a device. The system 100 includes a device 110 and a management server 130. The device 110 can be a computer, a mobile device such as a smartphone or tablet, and the like. The device 110 can be configured for operation in a mobile device management (MDM) environment. The device 110 can be configured to obtain authenticated access to a registration service 150 via the management server 130. The registration service 150 can facilitate registration of the device. The device 110 can be registered such that the management server 130 provides the device with access to services once the device is registered. Typically, the device 110 queries the management server 130 for access to the registration service 150. The management server 130 can authenticate the device by requesting and verifying a username and password combination. Upon verifying the username and password combination, the management server 130 registers the device 110 and provides the device with access to services. For example, a provisioned service profile can enable the device to access services associated with the service profile.

The information used to authenticate the device 110 is sent over communication link 120. Information sent over the communication link 120 is susceptible to being intercepted. In one aspect, a proxy between the device 110 and the device management server 130 can intercept data transmitted between the device 110 and the device management server 130. In another aspect, device users might not trust the management server 130 and prefer not to transmit sensitive information to the management server 130.

Thus, the inventors discovered a need in the art to provide access to a service by registering a device to a network without sending sensitive information across untrusted communication links or to untrusted third parties. According to techniques of the present disclosure, a device is registered without sending sensitive information to a third party or over an untrusted communication link.

Figure 2A:
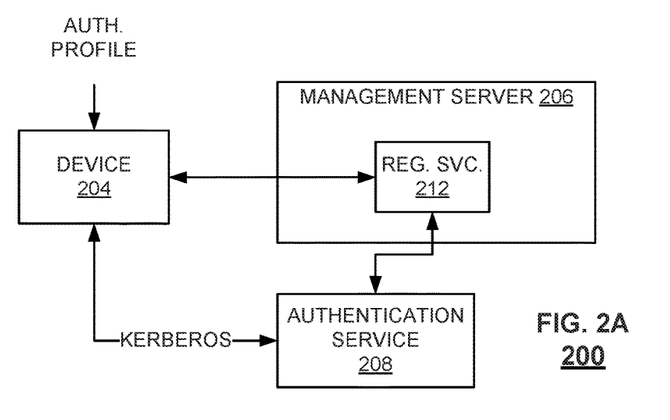
FIG. 2A is a block diagram illustrating an embodiment of a system for registering a device.

FIG. 2A is a block diagram illustrating an embodiment of a system 200 for registering a device. The system 200 includes device 204, management server 206, and authentication service 208. Successful registration provides the device with access to the service using the provision of service through MDM protocols. Registering the device 204 provides the device with access to a registration service 212. The registration service 212 can facilitate registration of the device. The device 204 can be registered such that the management server 206 provides the device with access to services once the device is registered. The device registration can take place if the device is not recognized, for example, the first time the device 204 attempts to access an MDM system, after the MDM system forgets the device, etc. In some instances, if a device is not registered, the device does not have information to access a service.

The device 204 can be a computer, a mobile device such as a smartphone or tablet, and the like. The device 204 can be configured for operation in an MDM environment. In various embodiments, the device 204 is registered using the techniques disclosed herein. The techniques described herein find application to mobile devices having a local client and web-based applications, including those operating on computers that are not necessarily mobile or portable.

The management server 206 can assign and/or send authentication profile(s) to the device 204. The authentication profile(s) can be sent by email (e.g., as an attachment), sent via an application, or locally available on the device 204. The management server 206 is communicatively coupled to the device 204. In some embodiments, the management server 206 can send the authentication profile (s) in response to receiving information from the device 204. In some embodiments, the management server 206 assigns the authentication profile in conjunction with an active directory (not shown). The active directory enables access and maintains distributed directory information services over a network. In some embodiments, the active directory can authenticate and authorize users and clients in a domain type network, for example, assigning and enforcing security policies and installing or updating software. The active directory can be implemented according to any lightweight directory access protocol (LDAP), for example, as a Microsoft® Active Directory service. In some embodiments, the active directory includes user role and need not include username and/or passwords.

The authentication service 208 can communicate with the device 204 to provide access to the registration service 212. For example, the authentication service 208 can provide service tickets usable to provide the device 204 with access to the registration service 212. The authentication service 208 can authenticate the device 204 and communicate with the device according to a protocol specified by the authentication profile(s).

In operation, the device 204 queries the management server 206 for registration. The query can include a request for a protocol by which to access one or more services. To enable access by the device 204 to the registration service 212, the management server 206, can provide an identification to the device. In some embodiments, the identification is provided over a channel different from the channel over which the original request is sent by the device 204. For example, a user can initiate the registration process using a link in a web browser and the management server 206 can respond by a text message including the identification. In some embodiments, exchange of information between the device 204 and the management server 206 is not sensitive information such that transmitting the identification over a channel does not create security vulnerabilities. For example, information exchanged between the device 204 and the management server 206 can be a tokenized representation of credentials.

Upon verifying the identity of the device, the management server 206 can assign and/or send authentication profile(s) (e.g., an SSO profile) to the device 204. The authentication profile(s) can include information about a realm and/or domain for which the device has authentication. The authentication profile(s) can be dynamically deployed for the device 204, which informs the device of the appropriate authentication protocol (e.g., Kerberos) to use for a particular domain. In some embodiments, the authentication profile(s) can be looked up by the management server 206 using an active directory (not shown). Upon receipt of the authentication profile, the device 204 can then participate in a Kerberos negotiation with the authentication service 208 to initiate a registration process with a management server and obtain services upon successful registration. In some embodiments, the Kerberos negotiation is performed according to conventional Kerberos authentication techniques.

In some embodiments, the system 200 can include an application gateway 202. The application gateway 202 can provide the authentication profile(s) in addition to or as an alternative to the authentication profile(s) provided by the management server 206.

In some embodiments, the authentication service 208 can include a proxy server (not shown). The proxy server can be communicatively coupled between the device 204 and an authentication server of the authentication service 208. For example, if the device 204 is not in the same network as the authentication service 208, the proxy server can communicate with an authentication server on behalf of the device to obtain authentication information usable by the device to access a service. The proxy server is a mechanism by which users learn each other's public keys through the exchange of digitally signed certificates. One type of proxy server is the Kerberos Key Distribution Center Proxy Protocol (KKDCP), which is a mechanism for a client to use a KKDCP server to change passwords and obtain Kerberos service tickets. The interaction between KKDCP and a Kerberos Key Distribution Center (KDC) is further described herein.

Figure 2B:
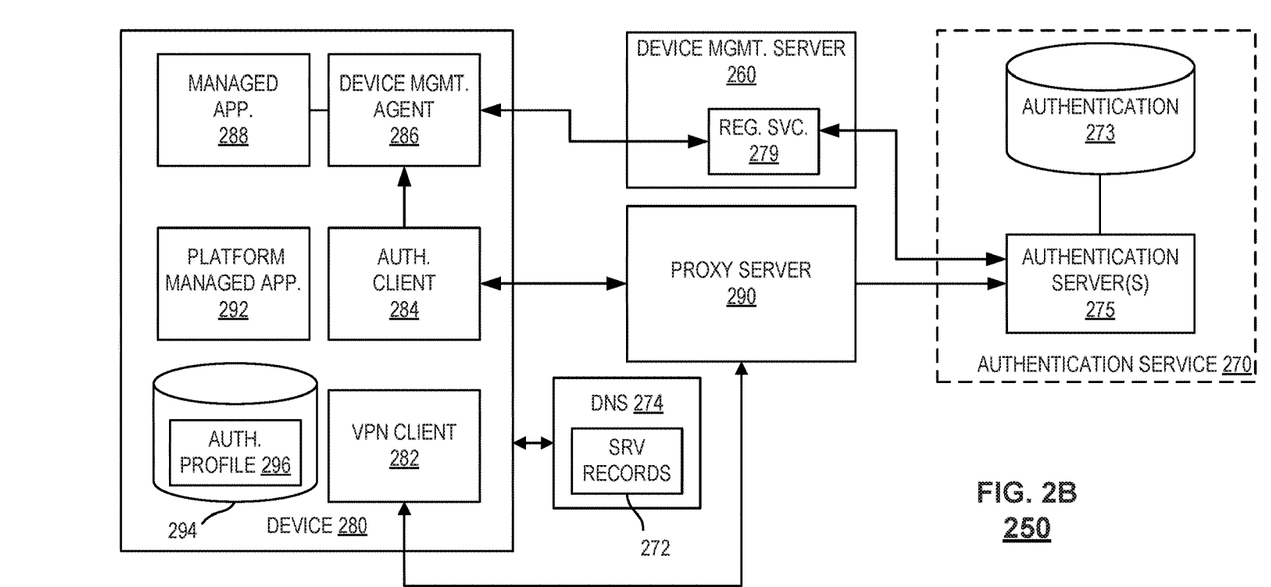
FIG. 2B is a block diagram illustrating an embodiment of a system for registering a device.

FIG. 2B is a block diagram illustrating an embodiment of a system 250 for registering a device. In the example shown, the system 250 includes a device 280, a proxy server 290 (e.g., security enforcement node), device management server 260, an authentication service 270, and a domain name system (DNS) 274.

The device 280 can be a computer, a mobile device such as a smartphone or tablet, and the like. The device 280 may include a management agent 286, managed applications 288, platform managed applications 292, an authentication client 284, a virtual private network (VPN) client 282, and authentication information storage 294. In certain cases, the device 280 is configured for operation in an MDM environment. The managed applications 288 may include and/or be modified to include a library, which configures the managed applications 288 for use in an MDM environment by, for example, allowing the device management agent 286 to control the managed applications 288. The library may include an authentication library (e.g., SSO library) that configures the managed applications 288 to access with a registration service 279 using the techniques disclosed herein. Platform managed applications 292 may include an application managed by a platform management engine (not shown). In certain cases, the platform managed applications 292 are configured to use the authentication techniques disclosed herein.

In various embodiments, the device 280 is configured to obtain authenticated access (e.g., SSO access) to the registration service 279 using the techniques disclosed herein. An authentication client 284 (e.g., SSO daemon) on the device 280 may obtain authentication information usable to access a registration service 279. In the example shown in FIG. 2B, the registration service 279 is contained in the device management server 260. The authentication client 284 may be associated with (a component of) an operating system installed on the device 280.

In some embodiments, the device management server 260 may assign and/or send authentication profiles 296 to a device 280. The authentication profiles 296 may be stored in authentication information storage 294 on the device 280. An authentication profile 296 may include a Kerberos profile, SSO profile, and/or other profile. The authentication profile 296 may configure and/or enable the device 280 to use Kerberos authentication and/or other authentication techniques. For example, the authentication profile 296 may include information that enables Kerberos for specific realms (e.g., domains), users, applications, and/or device types. The authentication profile 296 may configure an authentication client 284 (e.g., SSO daemon) on the device 280 to perform authentication operations (as needed and/or requested) to authenticate the applications included in the authentication profile 296 to the services located in the realms included in the authentication profile 296. In one example, an application 288, 292 on the device 280 may attempt to initiate registration, and the registration service 279 may respond via the management server 260 with an authentication challenge. The authentication challenge may indicate that the registration service 279 is configured for Kerberos authentication. In the event the registration service 279 is in a realm identified in the authentication profile 296 and/or the authentication challenge is directed to the user in the authentication profile 296, the authentication client 284 may be configured to obtain authentication information on behalf of the applications 288, 292.

In some embodiments, the authentication client 284 on the device 280 may be configured to communicate with an authentication service 270 (e.g., authentication servers, a Kerberos Authentication Server) via the proxy server 290 to obtain authentication information usable by applications 288, 292 on the device 280 to access the registration service 279. In some cases, an authentication service 270 includes a KDC including, for example, authentication server(s) 275, ticket granting servers (not shown), an authentication database 273 (e.g., storing user principal names (UPN), service principal names (SPN), and/or other information), and/or other components. In one example, the authentication service 270 may include and/or be associated with a Microsoft™ Active Directory service. The authentication client 284 may communicate with the authentication service 270 (e.g., KDC) via the proxy server 290 to obtain service tickets (also referred to as "tokens") usable to provide the device 280 with access to the registration service 279 within, for example, a realm. In various embodiments, multiple authentication services 270 (e.g., KDCs) may be deployed, and each authentication service 270 may be associated with a separate realm. In certain cases, the proxy server 290 determines an appropriate authentication service 270 to communicate with based on the realm information included in an authentication request. For example, a proxy server 290 may identify a realm in an authentication request, and communicate with authentication service 270 associated with that realm to obtain authentication information for a device 280.

An authentication client 284 may be configured to establish a connection to and/or discover the authentication service 270 using domain name system (DNS) resolution techniques. In certain cases, the DNS server 274 is configured with service records (SRV records) 272 in the public unsecured network to resolve DNS requests from the device 280 to the authentication service 270 to be mapped to the proxy server 290. In certain cases, SRV records 272 configure the DNS server 274 to publish only certain protocols, such as the Kerberos Key Distribution Center Proxy (MS-KKDCP) protocol, to the external network (e.g., public network) on a port for a Kerberos realm. In this case, the authentication client 284 may use a DNS resolution technique to discover the authentication service 270 (e.g., KDC). As part of the DNS resolution process, the authentication client 284 may attempt to connect to the authentication service using various protocols including, for example, User Datagram Protocol (UDP), Transmission Control Protocol (TCP), Hypertext Transfer Protocol (HTTP), KKDCP, and/or other protocols. In certain cases, only KKDCP is published by the DNS server 274 in the external network, and the authentication client 284 determines, based, for example, on failed attempts to connect via UDP, TCP, HTTP, and/or other protocols, that the authentication requests are to be sent over KKDCP. In some cases, the authentication client 284 may be configured to include a Kerberos client and/or a KKDCP client. The KKDCP client sends authentication requests to a KKDCP proxy associated with the proxy server 290 to obtain ticket granting tickets and/or service tickets to the device 280 for access to the registration service 279.

In various embodiments, the proxy server 290 receives authentication requests from the authentication client 284 and/or other components on the device 280. The proxy server 290 may, for example, listen for Kerberos requests tunneled via a standard and/or open protocol over HTTP, such as KKDCP. According to some embodiments, when the proxy server 290 receives an authentication request from the authentication client 284 and/or other components on the device 280, it interprets the authentication request (e.g., Kerberos message) to identify a user, a Kerberos realm, a service (e.g., protected corporate resource) for which the device 280 is attempting to get/retrieve authentication information (e.g., a ticket), and/or other information. The request is then validated by the proxy server. In contrast to conventional techniques, a management server or other third party is not exposed to sensitive information.

In some embodiments, a posture is dynamically determined based on the information from the authentication request. In some cases, the device management server 260 uses the user information (e.g., UPN), realm, services sought to be authenticated, certificates, and/or other information included in the request to identify a device 280 associated with the request, a user associated with the request, an identity of the registration service 279 sought to be accessed, and/or other information. This information is used to dynamically determine a posture of the device requesting authenticated access. The information may also be used to determine one or more policies to be applied to the dynamically determined posture and/or other information to validate the request.

In various embodiments, the proxy server 290 obtains authentication information from the authentication service 270 on behalf of the device. In certain cases, the proxy server 290 includes a KKDCP proxy that communicates with a KKDCP client on the device 280 and/or a KDC 270 to obtain a ticket granting ticket and/or service tickets usable by applications on the device 280 to access the registration service 279. The KKDCP proxy may obtain ticket granting tickets and/or service tickets on behalf of the KKDCP client and provide the tickets to the KKDCP client (e.g., associated with an authentication client 284) on the device 280. In certain cases, the authentication client 284 (e.g., a Kerberos client associated with the authentication client) uses the service ticket to authenticate the device 280 with the registration service 279. The authentication client 284 may, for example, provide a service ticket to the registration service 279 and the registration service 279 may use the service ticket to authenticate the application to initiate registration.

In some embodiments, the techniques disclosed herein are used to provide single sign-on functionality on a device 280. In one example, an application 288, 292 attempts to access a registration service 279 and the service replies with an authentication challenge that indicates the service is configured for single sign-on authentication (e.g., Kerberos). The authentication client 284 may be configured based on the authentication profile 296 to listen for authentication challenges from the registration service 279 to certain users (e.g., UPNs) and/or applications included in the profile. For example, if the registration service 279 is located in a realm included in the authentication profile 296, the authentication client 284 may conduct SSO authentication on behalf of the application. In some embodiments, if an authentication profile includes a certificate for the device, user authentication proceeds without requesting or transmitting a user password. A UPN for the user, a realm associated with the registration service 279, a certificate, and/or other information is sent to the proxy server 290 for delivery to the authentication server 275 associated with the KDC 270 using the techniques disclosed herein. The KDC 270 verifies the UPN, SPN, and/or other information with information in an authentication database 273. Once authenticated, the KDC 270 sends a ticket granting ticket to the authentication client 284 via the proxy server 290. The authentication client 284 may then send an authentication request including the ticket granting ticket, the UPN, an SPN associated with the registration service 279, and/or other information to a proxy server 290 for delivery to a ticket granting service associated with the KDC 270. The ticket granting service may validate the information in the request and reply with a service ticket usable to access the service. The proxy server 290 passes the service ticket to the authentication client 284, and the authentication client 284 uses the service ticket to authenticate the application 288, 292 to the registration service 279. At a later time that is prior to an expiration period of the ticket granting ticket, a second application 288, 292 may attempt to authenticate to the service and/or a second service associated with the same realm as the first service. An authentication challenge may be provided from the service to the application, and the authentication challenge is intercepted by the authentication client 284. Without prompting the user for login credentials, the authentication client 284 may send a request including the SPN of the service, the UPN, the ticket granting ticket, and/or other information to the KDC 270. The KDC 270 may validate the request and provide a service ticket for the service, and the authentication client 284 may use the service ticket to authenticate the application to the other service. The process may occur without any user interaction other than, for example, an initial username entry.

In various embodiments, once authenticated, the applications 288, 292 on the device 280 may be configured to securely communicate with and/or access the registration service 279 via a VPN client 282, such as a per-application VPN. The VPN client 282 may send information to the registration service 279 and/or receive information from the service via the proxy server 290. In some embodiments, once authenticated, the applications 288, 292 on the device are configured to securely communicate with and/or access the registration service 279 via a secure communication channel (e.g., a TLS-encrypted tunnel) between the device 280 and the proxy server 290.

Figure 3:
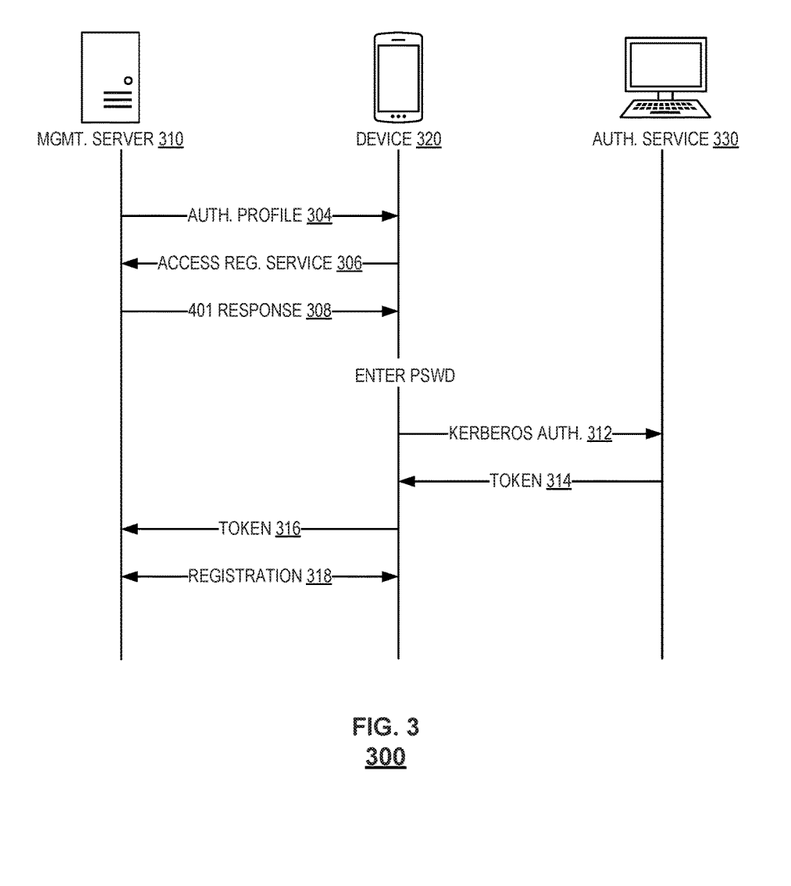
FIG. 3 is a functional diagram illustrating an embodiment of a system for registering a device.

FIG. 3 is a conceptual diagram illustrating an embodiment of a system 300 and messages 304-318 sent between system components to register a device. The system 300 includes a management server 310, device 320, and authentication service 330. The device 320 can have a local registration application (e.g., MDM client) or download the registration application. The management server 310 can include a registration service that facilitates registration of the device 320.

In some embodiment, if the device 320 is unregistered when it tries to access a service in an MDM system, the MDM client prompts the user for identification and/or a domain (e.g., realm). The identification can include a username, email, or other information that is not sensitive. The domain can be a location of a service that the device is attempting to access.

The management server 310 sends an authentication profile 304 to the device 320. The authentication profile 304 can be dynamically generated for the device 320, e.g., for an appropriate browser or configured specifically for the device. In response, the device 320 can accept installation of the authentication profile 304 and install the authentication profile onto the device. This authentication profile allows the device 320 to access a registration service 306. The management server 310 can then send a response 308 (e.g., a 401 response) to the device, directing the device to begin an authentication process with the authentication service 330. The device 320 can accept a user-entered password.

The device 320 and the authentication service 330 can then proceed with authentication 312, e.g., Kerberos authentication. In the authentication process, sensitive information such as a password is not exposed to an untrusted third party or over an untrusted communication link. Upon successful authentication, the device 320 obtains a token 314 from the authentication service. The device 320 can transmit a token 36 to the management server to initiate registration. The device 320 and the management server 310 can then engage in a registration process 318. Upon successful registration, the device can become registered with an MDM system such that the management server and the device trust each other. For example, the management server recognizes the device and becomes the managing entity for the device, and the device recognizes the management server as an MDM authority. The registered device can then access appropriate services in the MDM system.

Figure 4:
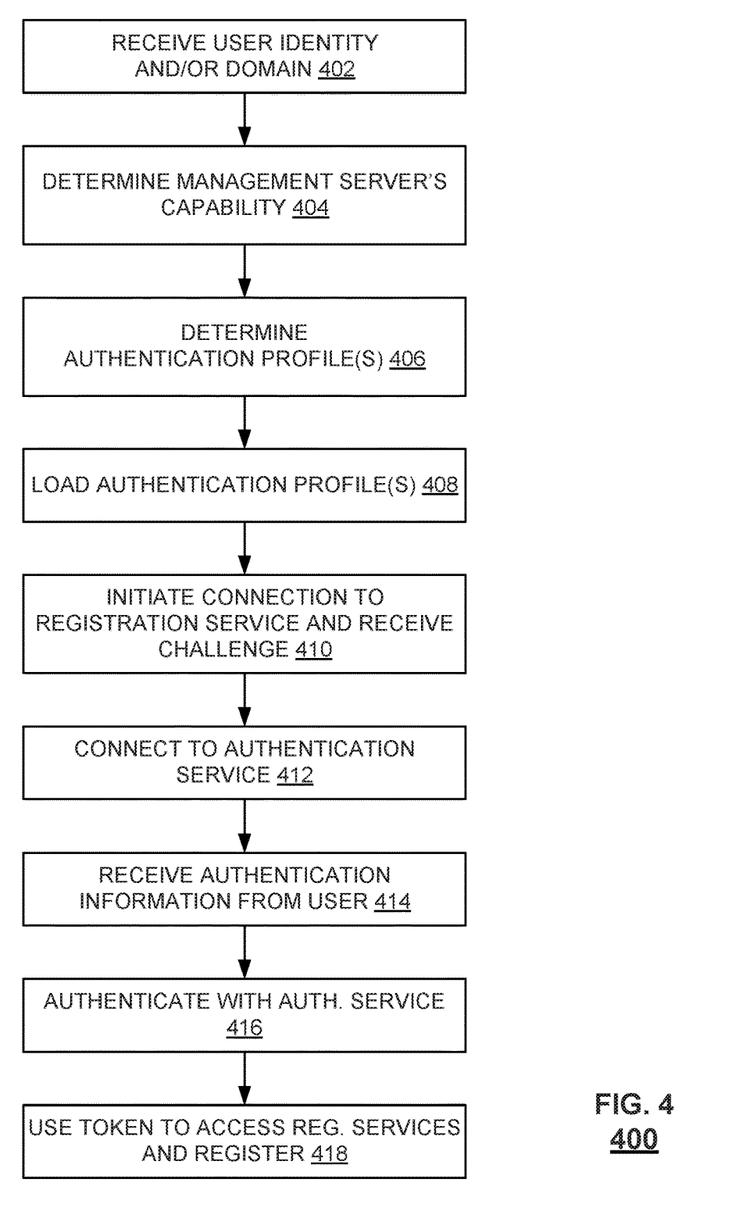
FIG. 4 is a flowchart illustrating an embodiment of a method to register a device.

FIG. 4 is a flowchart illustrating an embodiment of a method 400 to register a device with a system. The method 400 can be performed by a client on a device such as the mobile device 204 shown in FIG. 2A. The client can be a native MDM client on the device, which facilitates the registration process.

In 402, the method 400 receives an identity and/or a domain for which the user seeks access. The identity can include information identifying a user such as an email address. In some embodiments, the identity received is not sensitive such that the interception of the identification would not compromise the security of the system or the device attempting to register to the system. The domain for which the user seeks access can be a domain, a server hostname, or a Kerberos realm to which a device is attempting to register.

In 404, the method 400 determines a management server's capability. In some embodiments, the method 400 makes the determination by looking up a management server's capability from a global lookup server in a cloud. The determination of the management server's capability can be based on the received information. For example, the method 400 can determine whether the management server is capable of supporting a particular authentication protocol associated with the requested domain.

In 406, the method 400 determines authentication profile(s) appropriate for the device. In some embodiments, the authentication profile(s) include Kerberos settings. In other embodiments, the authentication profile(s) can be locally stored on the device. In some embodiments, the authentication profile(s) can be downloaded from an MDM server. The method 400 can download the authentication profile(s) to the device. The authentication profile(s) can be downloaded from the global lookup server, a target MDM server, another node, a combination thereof, or the like. In some embodiments, the authentication profile(s) can be determined and downloaded with the assistance of an application gateway that then pushes the authentication profile(s) to the client on the device as further described herein.

In 408, the method 400 loads the authentication profile(s). The authentication profile(s) can be compatible with the capabilities of the management server. For example, the authentication profile can include directions for and enable a Kerberos authentication process. In some embodiments, the authentication profile(s) include an SSO profile. An SSO profile can include configuration information such as iOS® Kerberos information (e.g., "com.apple.sso"), AppIdentifierMatches including the MDM client app id, and/or other information. In some embodiments in which the authentication profile(s) are locally stored, the loading of the authentication profile(s) includes preparing the local authentication profile(s) for use by the device.

In 410, the method 400 initiates a connection to a registration service. The initiation can cause the registration service to send a challenge, which challenge is received by the device. The challenge can be a query for tokens and/or tickets to proceed with registration. In 412, the method 400 connects the device to an authentication service such as an MDM server. In some embodiments, the MDM server is "Kerberos-enabled," meaning that the MDM server is capable of handling Kerberos authentication processes. The method 400 connects the device to a Kerberos-enabled MDM server according to conventional Kerberos techniques, in which a server responds with a Kerberos challenge for the device to initiate the Kerberos session.

In 414, the method 400 receives authentication information from the user. In some embodiments, the authentication information can be Kerberos authentication information, which avoids sending sensitive authentication information such as a password over channels that might be intercepted by a third party. Communication with an authentication service can proceed according to typical Kerberos procedures. In 416, the method 400 authenticates the user with the authentication service. In some embodiments, the authentication service issues a token. The method 400 then begins registration in 418. In some embodiments, registration includes using the token issued by the authentication service to access registration services. Registration can include storing data associated with a device and configuring the device in accordance with policies of the enterprise. In some embodiments, registration includes storing registration data associating the device with a management domain. In some embodiments, registration includes configuring the device to be managed according to policies of the management domain. In some embodiments, registration includes provisioning of services such as VPN, WiFi, email, and other applications. In some embodiments, the user may be provided with several attempts to authenticate before the method terminates.

In some embodiments, the method 400 can request the user's identity and/or domain prior to 402 (not shown). The identification information used for registering the device can be defined by company policy. The request can ask for information that is not sensitive and would not create a security vulnerability for the system. In one aspect, information that is sensitive is information that directly provides access to a service. For example, a password is sensitive information because in a conventional authentication system, entry of a correct password directly causes access to a service protected by the password. The method 400 can register a device without sensitive information and instead use identifying information such as a username, email, PIN, and the like. For example, the receipt of the user's identity in 402 can be in response to a request by the method 400. The request can be made using a user interface displayed on the device. In some embodiments, the method 400 can request the user's authentication information prior to 414 (not shown). For example, the receipt of the user's authentication information in 414 can be in response to a request by the method 400. The request can be made using a user interface displayed on the device.

In some embodiments, the request for authentication information can be made at a kernel level. That is, the method 400 finds application for devices having native single sign-on support (e.g., Kerberos support) as well. For example, method 400 can be used to register devices with Kerberos enabled at the kernel level (e.g., Android® devices).

Figure 5:
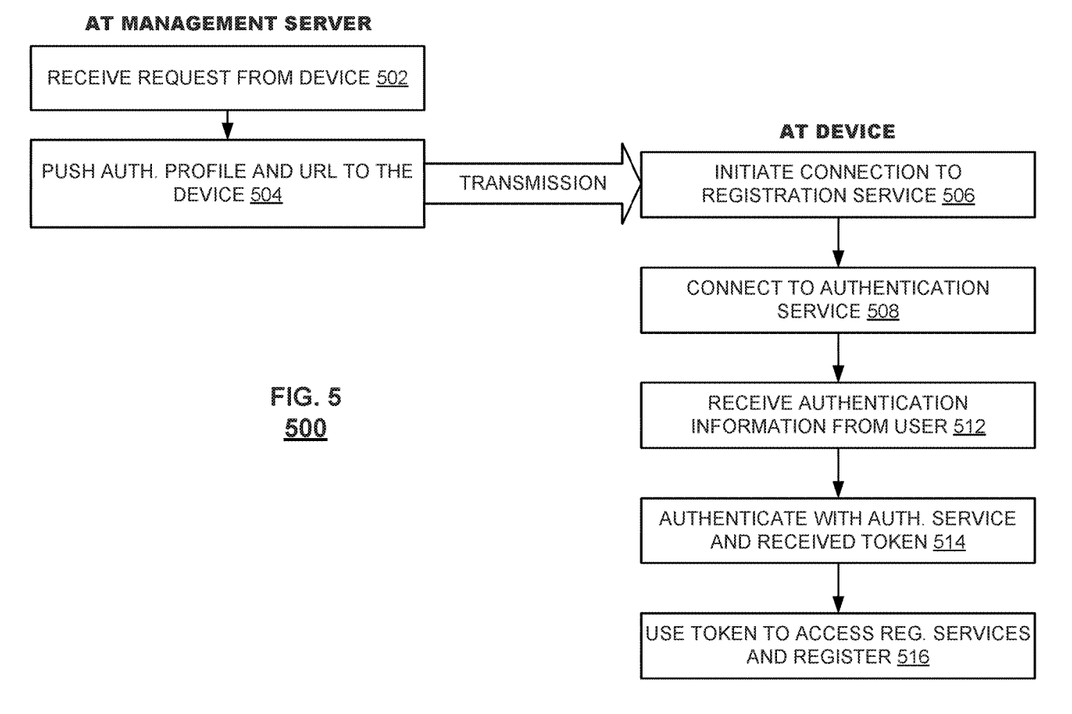
FIG. 5 is a flowchart illustrating an embodiment of a method to register a device.

FIG. 5 is a flowchart illustrating an embodiment of a method 500 to register a device with a system. In some embodiments, the method 500 is a web-based registration process. As shown, 502 and 504 of the method 500 can be performed by a management server such as the management server 206 shown in FIG. 2A and 506-514 can be performed by a device such as the device 204 shown in FIG. 2A. For example, 506-514 can performed by a web browser on the device.

In 502, the method 500 receives, at a management server, a request from a device. The request can include information about a domain or realm for which the device seeks access, a location of an authentication profile that would enable access to a domain, and the like. For example, a user of the device enters a server address. In 504, in response to the request, the management server pushes an authentication profile to the device. The authentication profile provides instructions for communicating with an authentication server such as an MDM server to obtain access to a service in the requested domain. In some embodiments, the configuration profile is an SSO profile including iOS Kerberos (e.g., "com.apple.sso"). In some embodiments, in 504, the method 500 also redirects the device to an MDM server's link (e.g., URL). The MDM server can be Kerberos-enabled.

In 506, the method 500 initiates a connection to a registration service. The initiation can cause the registration service to send a challenge, which challenge is received by the device. The challenge can be a query for tokens and/or tickets to proceed with registration. In 508, the method 500 connects the device to an authentication service such as an MDM server. In some embodiments, the MDM server is "Kerberos-enabled," meaning that the MDM server is capable of handling Kerberos authentication processes. The method 500 connects the device to a Kerberos-enabled MDM server according to conventional Kerberos techniques, in which a server responds with a Kerberos challenge for the device to initiate the Kerberos session.

In 512, the method 500 receives authentication information from the user. In some embodiments, the authentication information can be Kerberos authentication information, which avoids sending sensitive authentication information such as a password over channels that might be intercepted by a third party. Communication with an authentication service can proceed according to typical Kerberos procedures. In 514, the method 500 authenticates the user with the authentication service. In some embodiments, the authentication service issues a token. The method 500 then begins registration in 516. In some embodiments, registration includes using the token issued by the authentication service to access registration services. Registration can include storing data associated with a device and configuring the device in accordance with policies of the enterprise. In some embodiments, registration includes storing registration data associating the device with a management domain. In some embodiments, registration includes configuring the device to be managed according to policies of the management domain. In some embodiments, registration includes provisioning of services such as VPN, WiFi, email, and other applications. In some embodiments, the user may be provided with several attempts to authenticate before the method terminates.

In some embodiments, the method 500 can request the user's identity and/or domain prior to 502 (not shown). The identification information used for registering the device can be defined by company policy. The request can ask for information that is not sensitive and would not create a security vulnerability for the system. In one aspect, information that is sensitive is information that directly provides access to a service. For example, a password is sensitive information because in a conventional authentication system, entry of a correct password directly causes access to a service protected by the password. The method 500 can register a device without sensitive information and instead use identifying information such as a username, email, PIN, and the like. For example, the receipt of the user's identity in 502 can be in response to a request by the method 500. The request can be made using a user interface displayed on the device. In some embodiments, the method 500 can request the user's authentication information prior to 512 (not shown). For example, the receipt of the user's authentication information in 512 can be in response to a request by the method 500. The request can be made using a user interface displayed on the device.

In some embodiments, the request for authentication information can be made at a kernel level. That is, the method 500 finds application for devices having native single sign-on support (e.g., Kerberos support) as well. For example, method 500 can be used to register devices with Kerberos enabled at the kernel level (e.g., Android® devices).

Figure 6:
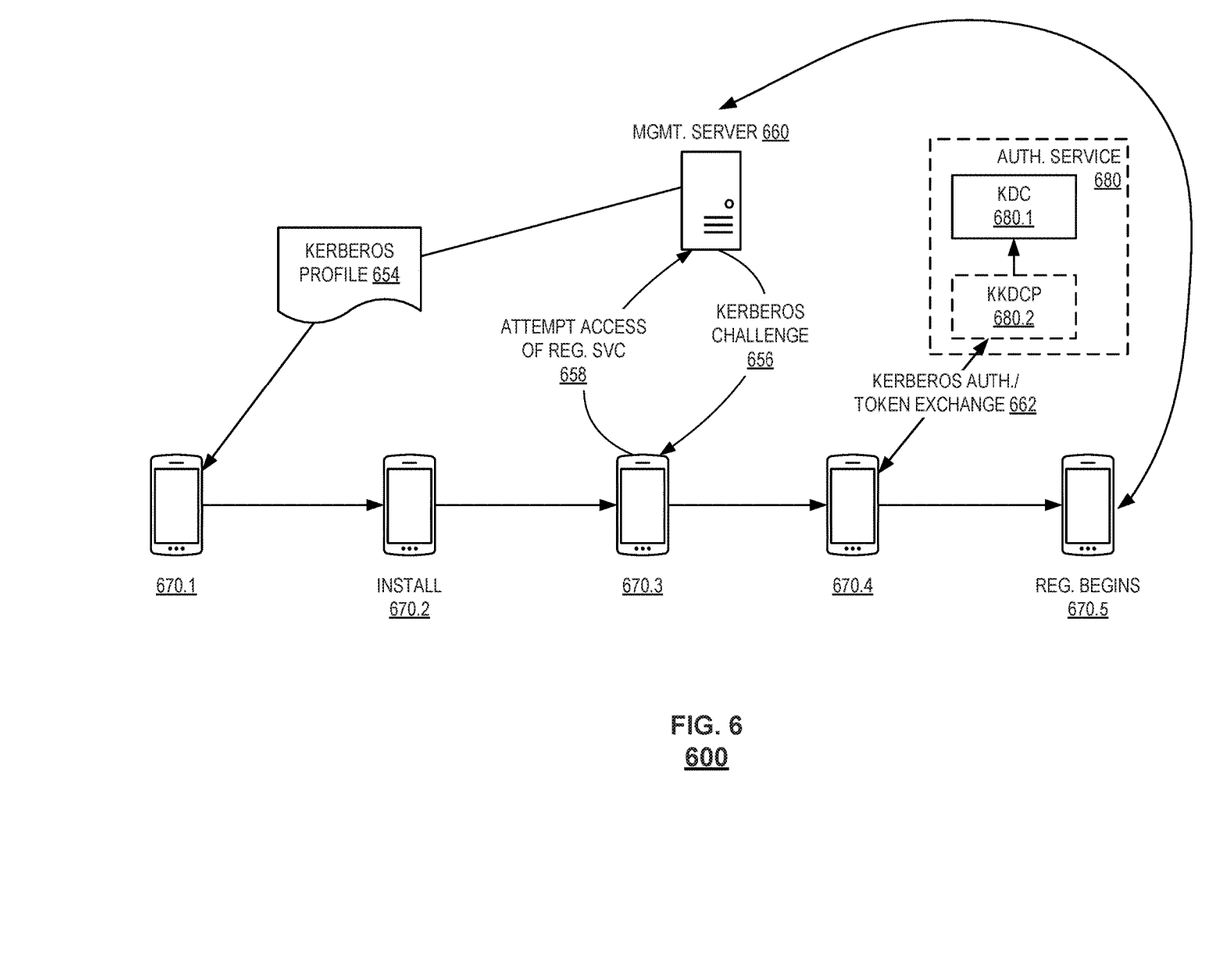
FIG. 6 is a functional diagram illustrating an embodiment of a system for registering a device.

FIG. 6 is a conceptual diagram illustrating an embodiment of a system 600 for registering a device with an MDM system. The system 600 includes a sequence of screens 670.1-670.5 showing various states of the device during interaction with the system. The system 500 shows the registration process using the example of Kerberos as an authentication profile, KDC as an authentication server, and KKDCP as a proxy server.

When an unrecognized device requests access to a service, an MDM client on the device can request identification from the user. For example, the user can be prompted to enter the user's email via a user interface on the device. In 670.1, in response to the request, the management server 660 can provide a Kerberos profile 654 with a registration link. The Kerberos profile 654 can include a registration link. The activation of the registration link by the user can cause the Kerberos profile to be downloaded and/or installed on the device.

In 670.2, the user can be prompted for whether the Kerberos profile should be installed. Upon acceptance, the Kerberos profile is installed onto the user's device, enabling Kerberos authentication between the device and an authentication service 680. In some embodiments, the authentication service 680 includes an authentication server (KDC) 680.1 and a proxy server (KKDCP) 680.2. The Kerberos authentication can include authentication between the device and the authentication server (KDC) 680.1 via the proxy server (KKDCP) 680.2.

In 670.3, the device attempts to access registration service (658) by querying the management server 660. In the example shown, the registration service is contained in the management server 660. The management server 660 can respond with a Kerberos challenge 656. The Kerberos challenge can be for the device to initiate a Kerberos session.

In 670.4, the device engages in Kerberos authentication (662) with the proxy server and/or authentication server. In 662, Kerberos authentication is performed without sending the user entered password over a network. For example, to verify identity, the kernel can be prompted for the password, without the knowledge of the application on the device such as a browser or MDM client providing the authentication to the end service. No password or other sensitive information needs to be sent over a network in the authentication process, thus decreasing the susceptibility of the communications to compromise of sensitive information by a third party. In some embodiments, the system 600 allows for SSO such that subsequent to state 670.5, the device can access an enterprise application without transmitting the password over a network.

The techniques disclosed herein may be implemented on various platforms including, but not limited to, the following:
  iOS mobile device with native MDM client
  iOS® mobile device with web-based MDM registration
  Android® mobile device with native MDM client
  Windows® mobile device with MDM client In some embodiments, the techniques disclosed herein may be implemented in the context of a platform with native Kerberos support. In certain cases, an MDM client may embed Kerberos support. In various embodiments, an enterprise that has already enabled Kerberos may use the techniques disclosed herein to utilize Kerberos when registering a device to an MDM platform. In certain cases, the techniques disclosed herein may be used to register a device that is not configured for Kerberos.

Unlike conventional registration techniques, the techniques of the present disclosure provide lookup of a service using a management server or application gateway. The management server or application gateway provides information about: (i) the service and (ii) how to authenticate. In this way, the management server does not see the password, and any password or other sensitive information is kept private between the device and the authentication service (or the proxy server, if the device is outside the network). The proxy server provides tickets to the device to access individual services.

In various embodiments, Kerberos and/or other authentication techniques may provide a higher level of security during device MDM registration than User ID and password and/or PIN-based registration approaches. The techniques disclosed herein allow Kerberos and/or other authentication techniques to be used during device registration. Using the disclosed techniques, a user may sign on to company services using Kerberos after registration and without providing sensitive authentication information over an untrusted communication link. The sign-on may occur with an unnoticeable delay from the perspective of the user, e.g., quickly or immediately.

Using the techniques disclosed herein, a user's password is not to be passed to an intermediate system other than Kerberos. Instead, other type of identification such as a username are sufficient to identify the user and proceed with registration of the device. In various embodiments, upon initial registration via a system provided Kerberos, a user can access company resources without entering or transmitting sensitive information such as a password. The techniques described herein improve the functioning of a computer and network by improving the security of communications between devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, at a registration service, a request to register an unregistered device as a device managed at least in part by a mobile device management (MDM) system, wherein the request includes non-sensitive information identifying the device and a domain for which the device seeks access;
    determining that the requesting device is unrecognized by the MDM system;
    in response to the determination that the requesting device is unrecognized, using the request to dynamically generate an authentication profile for the requesting device, wherein the authentication profile is adapted to configure an authentication client to perform authentication operations to authenticate applications included in the authentication profile to services located in the domain;
    sending the authentication profile to the device;
    sending, in response to the request, a response redirecting the requesting device to authenticate via an authentication service of an enterprise, wherein the device is configured via the authentication profile to authenticate via the authentication service of the enterprise, and the authentication service does not require user communication of login credentials to the authentication service;
    receiving, from the device, a token issued by the authentication service of the enterprise; and
    providing access to the registration service based at least in part on receiving the token, including by allowing the registration service to be used to register the device as a device managed at least in part by the enterprise.

2. The method of claim 1, wherein the device is configured to install the authentication profile.

3. The method of claim 1, further comprising storing registration data associating the device with a management domain.

4. The method of claim 3, wherein the registration of the device includes configuring the device to be managed according to policies of the enterprise for the management domain.

5. The method of claim 1, wherein the authentication profile is a single sign-on (SSO) profile.

6. The method of claim 1, wherein the authentication profile defines a Kerberos authentication process.

7. The method of claim 1, wherein the authentication profile is dynamically adapted to at least one characteristic of the device.

8. The method of claim 1, wherein the authentication profile is uploaded to the device.

9. The method of claim 1, wherein the authentication service does not require user entry of a password.

10. The method of claim 1, wherein the device includes a native mobile device management (MDM) client.

11. The method of claim 1, wherein the device is a mobile device.

12. The method of claim 1, wherein the authentication service includes a proxy server, the proxy server configured to obtain authentication information usable by the device to access the registration service.

13. A method, comprising:
    sending to a registration service a request to register an unregistered device as a device managed at least in part by a mobile device management (MDM) system, wherein the request includes non-sensitive information identifying the device and a domain corresponding to the registration service;
    receiving an authentication profile, wherein the authentication profile is dynamically generated in response to a determination by the registration service that the device is unrecognized by the MDM system;
    receiving a response redirecting the device to authenticate via an authentication service of an enterprise, wherein the device is configured via the authentication profile to authenticate via the authentication service of the enterprise, and the authentication service does not require user communication of login credentials to the authentication service;
    receiving a token issued by the authentication service of the enterprise;
    sending the token to initiate the registration service; and
    responsive to an indication from the registration service, recognizing the enterprise as a manager of the device.

14. The method of claim 13, wherein the authentication profile is downloaded to the device.

15. The method of claim 13, wherein the authentication profile is locally stored on the device.

16. The method of claim 13, wherein the authentication profile is received in an email.

17. The method of claim 13, wherein the authentication profile is a single sign-on (SSO) profile.

18. The method of claim 13, wherein communication with an authentication server is according to Kerberos.

19. The method of claim 13, wherein the request does not include a password.

20. A system, comprising:
    a processor configured to:
        receive, at a registration service, a request to register an unregistered device as a device managed at least in part by a mobile device management (MDM) system, wherein the request includes non-sensitive information identifying the device and a domain for which the device seeks access;

determine that the requesting device is unrecognized by the MDM system;

in response to the determination that the requesting device is unrecognized, use the request to dynamically generate an authentication profile for the requesting device, wherein the authentication profile is adapted to configure an authentication client to perform authentication operations to authenticate applications included in the authentication profile to services located in the domain;

send the authentication profile to the device;

send, in response to the request, a response redirecting the requesting device to authenticate via an authentication service of an enterprise, wherein the device is configured via the authentication profile to authenticate via the authentication service of the enterprise, and the authentication service does not require user communication of login credentials to the authentication service;

receive, from the device, a token issued by the authentication service of the enterprise; and provide access to the registration service based at least in part on receiving the token, including by allowing the registration service to be used to register the device as a device managed at least in part by the enterprise; and a memory coupled to the processor and configured to provide the processor with instructions.

21. A device, comprising:

a processor configured to:

send to a registration service a request to register the device as an unregistered device managed at least in part by a mobile device management (MDM) system, wherein the request includes non-sensitive information identifying the device and a domain corresponding to the registration service;

receive an authentication profile, wherein the authentication profile is dynamically generated in response to a determination by the registration service that the device is unrecognized by the MDM system;

receive a response redirecting the device to authenticate via an authentication service of an enterprise, wherein the device is configured via the authentication profile to authenticate via the authentication service of the enterprise, and the authentication service does not require user communication of login credentials to the authentication service;

receive a token issued by the authentication service of the enterprise;

send the token to initiate the registration service; and responsive to an indication from the registration service, recognize the enterprise as a manager of the device; and a memory coupled to the processor and configured to provide the processor with instructions.

22. A computer program product, the computer program product being embodied in a non-transitory computer readable storage medium and comprising computer instructions for:

receiving, at a registration service, a request to register an unregistered device as a device managed at least in part by a mobile device management (MDM) system, wherein the request includes non-sensitive information identifying the device and a domain for which the device seeks access;

determining that the requesting device is unrecognized by the MDM system;

in response to the determination that the requesting device is unrecognized, using the request to dynamically generate an authentication profile for the requesting device, wherein the authentication profile is adapted to configure an authentication client to perform authentication operations to authenticate applications included in the authentication profile to services located in the domain;

sending the authentication profile to the device;

sending, in response to the request, a response redirecting the requesting device to authenticate via an authentication service of an enterprise, wherein the device is configured the authentication profile including information enabling the device to authenticate via the authentication service of the enterprise, and the authentication service does not require user communication of login credentials to the authentication service;

receiving, from the device, a token issued by the authentication service of the enterprise; and providing access to the registration service based at least in part on receiving the token, including by allowing the registration service to be used to register the device as a device managed at least in part by the enterprise.

* * * * *

UNITED STATES PATENT AND TRADEMARK OFFICE
CERTIFICATE OF CORRECTION

PATENT NO.        : 10,404,684 B1
APPLICATION NO.   : 14/966511
DATED             : September 3, 2019
INVENTOR(S)       : Sudheer Babu Chittireddy and Mansu Kim Page 1 of 1

It is certified that error appears in the above-identified patent and that said Letters Patent is hereby corrected as shown below:

In the Specification

In Column 12, Line 48, delete "iOS" and insert --iOS®--, therefor.

Signed and Sealed this
Twenty-fifth Day of February, 2020

Andrei Iancu
*Director of the United States Patent and Trademark Office*